US007974060B2

(12) United States Patent
Morino

(10) Patent No.: US 7,974,060 B2
(45) Date of Patent: Jul. 5, 2011

(54) OVERCURRENT LIMITATION AND OUTPUT SHORT-CIRCUIT PROTECTION CIRCUIT, VOLTAGE REGULATOR USING OVERCURRENT LIMITATION AND OUTPUT SHORT-CIRCUIT PROTECTION CIRCUIT, AND ELECTRONIC EQUIPMENT

(75) Inventor: Koichi Morino, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 514 days.

(21) Appl. No.: 12/219,525

(22) Filed: Jul. 23, 2008

(65) Prior Publication Data

US 2009/0046404 A1 Feb. 19, 2009

(30) Foreign Application Priority Data

Aug. 17, 2007 (JP) ................................ 2007-212808

(51) Int. Cl.
*H02H 9/08* (2006.01)

(52) U.S. Cl. ...................................................... 361/93.9

(58) Field of Classification Search ................. 361/93.9; 323/276, 277
See application file for complete search history.

(56) References Cited

U.S. PATENT DOCUMENTS 7,183,755 B2 * 2/2007 Itoh et al. ...................... 323/274
2003/0128489 A1 * 7/2003 Katoh et al. ................. 361/93.9
2008/0285198 A1 * 11/2008 Morino ........................ 361/93.9

FOREIGN PATENT DOCUMENTS

JP 3782726 3/2006
JP 2006-178539 7/2006

* cited by examiner

*Primary Examiner* — Jared J Fureman
*Assistant Examiner* — Angela Brooks
(74) *Attorney, Agent, or Firm* — Dickstein Shapiro LLP

(57) ABSTRACT

A disclosed overcurrent protection and output short-circuit protection circuit has a proportional output current generation unit and a first current voltage conversion unit provided in series between a first power supply terminal and an output terminal. Furthermore, the overcurrent protection and output short-circuit protection circuit has a control unit that operates based on a difference between a voltage generated at the first current voltage conversion unit and that generated at a second current voltage conversion unit provided between the first power supply terminal and a second power supply terminal. A current flowing to the second current voltage conversion unit is changed by one or more switching elements in a stepwise manner based on the output voltages of the output transistor when supplying the current, thereby changing the voltages generated at both ends of the second current voltage conversion unit.

9 Claims, 13 Drawing Sheets

PRIOR ART

OVERCURRENT LIMITATION AND OUTPUT SHORT-CIRCUIT PROTECTION CIRCUIT, VOLTAGE REGULATOR USING OVERCURRENT LIMITATION AND OUTPUT SHORT-CIRCUIT PROTECTION CIRCUIT, AND ELECTRONIC EQUIPMENT

BACKGROUND OF THE INVENTION

1. Field of the Invention

The present invention relates to a technique for an overcurrent limitation and output short-circuit protection circuit of a voltage regulator and, in particular, to an overcurrent protection and output short-circuit protection circuit that is easily designed and capable of being realized by a small circuit with low power consumption, a voltage regulator using the overcurrent limitation and output short-circuit protection circuit, and various electronic equipment items such as mobile electronic devices including mobile phones, in-vehicle electric components, and home electric appliances.

2. Description of the Related Art

As overcurrent protection circuits of a power supply circuit, for example, disclosures in JP-A-2006-178539 (Patent Document 1) and JP-B2-3782726 (Patent Document 2) have been proposed.

JP-A-2006-178539 (Patent Document 1) discloses a technique for protecting an IC (Integrated Circuit) with a current limitation mode and a fold-back mode created by two circuit configurations of an overcurrent protection circuit and a short-circuit current protection circuit that set a maximum current value and a short-circuit current value, respectively.

In Patent Document 1, the fold-back mode of the short-circuit current protection circuit requires phase compensation. However, it is difficult to design the phase compensation in consideration of variations in manufacturing.

JP-B2-3782726 (Patent Document 2) discloses a technique for controlling a switching unit based on an output voltage at the time of supplying a current, thereby validating or invalidating a current voltage conversion unit that converts the output current of a proportional output current generation unit into a voltage.

Patent Document 2 is similar to the present invention in that the switching unit is controlled based on the output voltage at the time of supplying the current. When the output current of the proportional output current generation unit is attempted to be fed to an output node via the current voltage conversion unit so as to prevent the same from being invalidated, an IC (Integrated Circuit) having an output current of several hundred mA is effective because it is capable of making the resistance value of the switching unit much smaller than the resistance value of the current voltage conversion unit. However, in the case of an IC having an output current of 1 A or larger, the area of the switching unit disadvantageously becomes large so as to make the resistance value of the switching unit much smaller than the resistance value of the current voltage conversion unit.

Patent Document 1: JP-A-2006-178539

Patent Document 2: JP-B2-3782726

FIG. 1 is a diagram showing examples of an overcurrent protection circuit and an output short-circuit protection circuit of a conventional voltage regulator, and FIG. 2 is a graph showing the characteristics of an output current and an output voltage in the voltage regulator. An overcurrent protection circuit 1 in FIG. 1 determines the current limitation mode and the value of Imax in FIG. 2. On the other hand, the output short-circuit protection circuit 1 in FIG. 1 determines the fold-back mode and the value of Ishort in FIG. 2.

The circuit of a conventional voltage regulator is complicated because it requires the overcurrent protection circuit and the output short-circuit protection circuit. In addition, it is difficult to design the voltage regulator because the fold-back mode of the output short-circuit protection circuit requires the phase compensation.

Moreover, the voltage regulator requires the proportional output current generation units that generate a current proportional to a current flowing to an output transistor M1 (namely, a proportional output current generation unit M2 for the overcurrent protection circuit and a proportional output current generation unit M3 for the output short-circuit protection circuit) for each of the overcurrent protection circuit and the output short-circuit protection circuit. The output current of the proportional output current generation unit M2 for the overcurrent protection circuit and that of the proportional output current generation unit M3 for the output short-circuit protection circuit are fed to ground via their current voltage conversion units (namely, a current voltage conversion unit R2 for the overcurrent protection circuit and a current voltage conversion unit R3 for the output short-circuit protection circuit). Therefore, as the output current of the output transistor M1 increases, the power consumption of the IC increases proportionately.

Accordingly, an overcurrent protection and output short-circuit protection circuit of the voltage regulator is desired that solves the above deficiencies, achieves the overcurrent protection and the short-circuit current protection with a single current limitation circuit, is easily designed at low cost and capable of being realized by a small circuit with low power consumption.

SUMMARY OF THE INVENTION

In view of the above circumstances, the present invention may realize output short-circuit protection without using a fold-back mode so as to provide an overcurrent protection and output short-circuit protection circuit that is easily designed and capable of being realized by a small circuit with low power consumption, a voltage regulator using the overcurrent protection and output short-circuit protection circuit, and various electronic equipment items such as mobile electronic devices including mobile phones, in-vehicle electric components, and home electric appliances.

To this end, embodiments of the present invention adopt the following configurations.

According to one aspect of the present invention, there is provided an overcurrent limitation and output short-circuit protection circuit of a DC stabilized power supply circuit that drives an output transistor (M1) so as to make an output voltage constant based on the output of a differential amplifier that amplifies a difference between a reference voltage and a voltage proportional to the output voltage. The overcurrent limitation and output short-circuit protection circuit comprises a proportional output current generation unit (M2) that generates a current proportional to a current flowing to the output transistor (M1); a first current voltage conversion unit (R1) that converts the output current of the proportional output current generation unit (M2) into a voltage; a first power supply terminal; an output terminal; a second power supply terminal; a second current voltage conversion unit (R2) provided between the first power supply terminal and the second power supply terminal; a control unit (M3) that operates based on a difference between the voltage generated at the first current voltage conversion unit (R1) and a voltage generated at the second current voltage conversion unit (R2); and one or more switching elements (M20 and M21). The proportional output current generation unit (M2) and the first current voltage conversion unit (R1) are connected in series between the first power supply terminal and the output terminal, and a current flowing to the second current voltage conversion unit (R2) is changed by the one or more switching elements (M20 and M21) in a stepwise manner based on the output voltage of the output transistor (M1) when supplying a current, thereby changing the voltages generated at both ends of the second current voltage conversion unit (R2).

According to this configuration, the proportional output current generation unit (M2) that generates the current proportional to the current flowing to the output transistor (M1) and the first current voltage conversion unit (R1) that converts the output current of the proportional output current generation unit (M2) into the voltage are provided between the first power supply terminal and the output terminal. Therefore, the output current of the proportional output current generation unit (M2) does not lead to power consumption of an IC (Integrated Circuit), thereby attaining the reduction of power consumption. Furthermore, this configuration realizes output short-circuit protection without using a fold-back characteristic. Therefore, the overcurrent limitation and output short-circuit protection circuit does not require phase compensation, which facilitates the design of the circuit.

According to another aspect of the present invention, there is provided an overcurrent limitation and output short-circuit protection circuit of a DC stabilized power supply circuit that drives an output transistor (M1) so as to make an output voltage constant based on the output of a differential amplifier that amplifies a difference between a reference voltage and a voltage proportional to the output voltage. The overcurrent limitation and output short-circuit protection circuit comprises a proportional output current generation unit (M2) that generates a current proportional to a current flowing to the output transistor (M1); a first current voltage conversion unit (R1) that converts the output current of the proportional output current generation unit (M2) into a voltage; a first power supply terminal; an output terminal; a second current voltage conversion unit (R2) provided between the first power supply terminal and the output terminal; a control unit (M3) that operates based on a difference between the voltage generated at the first current voltage conversion unit (R1) and a voltage generated at the second current voltage conversion unit (R2); and one or more switching elements (M21 and M22). The proportional output current generation unit (M2) and the first current voltage conversion unit (R1) are connected in series between the first power supply terminal and the output terminal, and a current flowing to the second current voltage conversion unit (R2) is changed by the one or more switching elements (M20 and M21) in a stepwise manner based on the output voltage of the output transistor (M1) when supplying a current, thereby changing the voltages generated at both ends of the second current voltage conversion unit (R2).

According to this configuration, the proportional output current generation unit (M2) that generates the current proportional to the current flowing to the output transistor (M1), the first current voltage conversion unit (R1) that converts the output current of the proportional output current generation unit (M2) into the voltage, and the second current voltage conversion unit (R2) are provided between the first power supply terminal and the output terminal. Therefore, in a voltage regulator circuit having plural power supply voltages, the overcurrent limitation and output short-circuit protection circuit with low power consumption can be realized.

Preferably, the one or more switching elements may be provided in plural branched current paths passing through the second current voltage conversion unit R2 and controlled to be turned on or turned off by the output voltage or a voltage generated based on the output voltage.

Preferably, the proportional output current generation unit (M2) may have a resistor and a transistor in series connection, the first current voltage conversion unit and the second current voltage conversion unit may have a resistor, and the control unit may have a transistor.

Preferably, the switching elements may be changed in a stepwise manner based on the output voltage when a power supply voltage rises from zero. In addition, the overcurrent limitation and output short-circuit protection circuit may further comprise a unit that fixes at least one of the plural switching elements when the power supply voltage rises from zero.

According to these configurations, the switching elements are changed in a stepwise manner even when the power supply voltage rises from zero, thereby controlling the current flowing to the output transistor (M1). Therefore, an unnecessary overcurrent can be reduced.

According to still another aspect of the present invention, there is provided a voltage regulator including the overcurrent limitation and output short-circuit protection circuit described above or electronic equipment including the voltage regulator, such as a mobile electronic device, a DC-DC converter, an in-vehicle electric component, and a home electric appliance.

According to this configuration, the voltage regulator and various electronic equipment items with low power consumption can be realized by incorporating the overcurrent limitation and output short-circuit protection circuit described above.

Other objects, features and advantages of the present invention will become more apparent from the following detailed description when read in conjunction with the accompanying drawings.

DETAILED DESCRIPTION OF THE PREFERRED EMBODIMENTS

Figure 1:
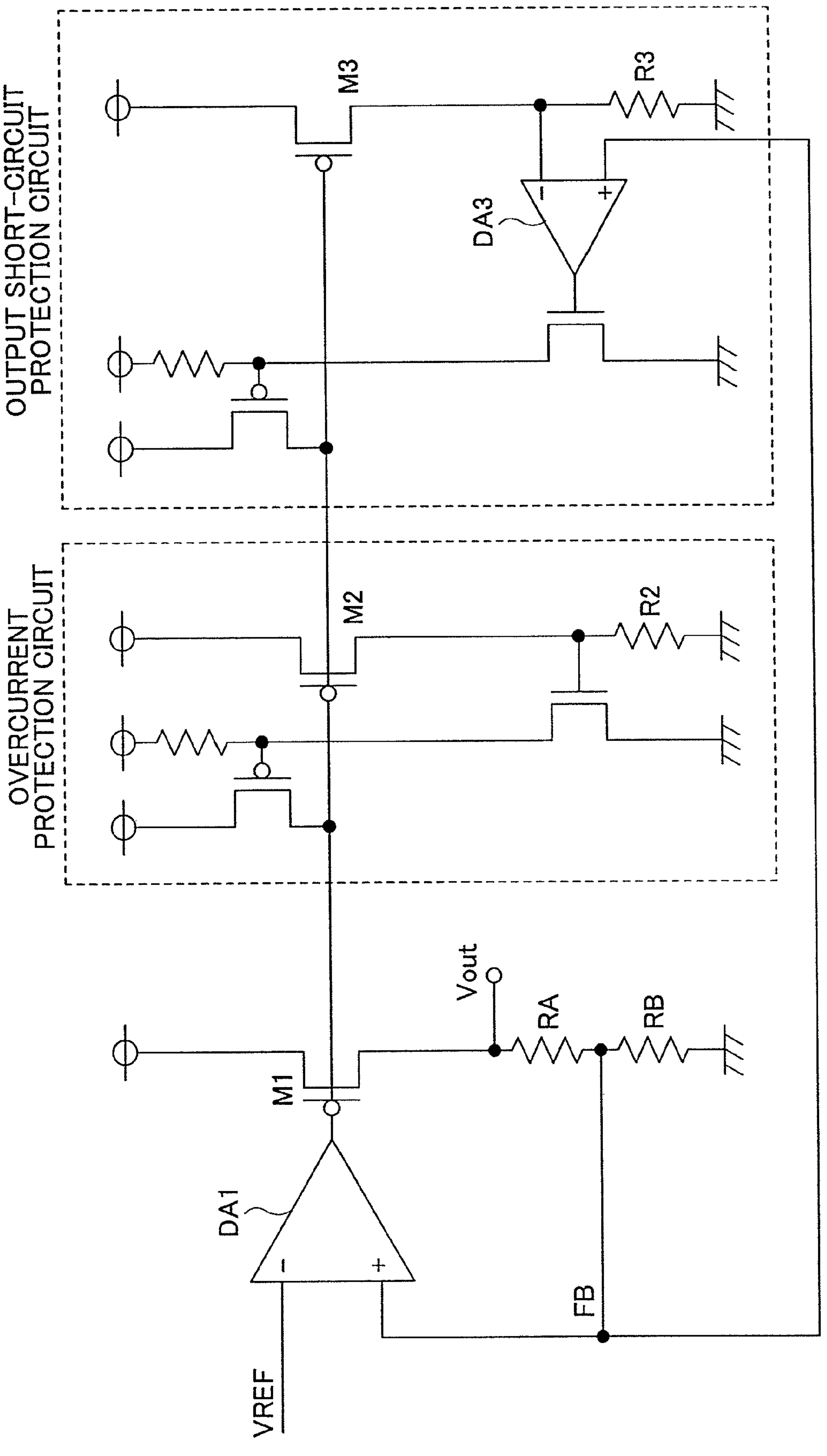
FIG.1 PRIOR ART
FIG. 1 is a diagram showing examples of an overcurrent protection circuit and an output short-circuit protection circuit of a conventional voltage regulator.
Figure 2:
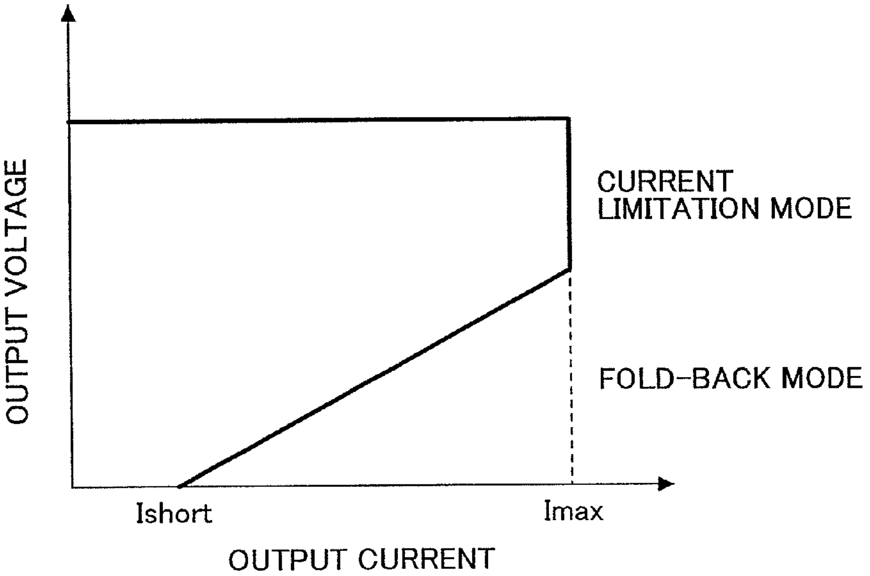
FIG. 2 is a graph showing the characteristics of an output current and an output voltage in the conventional voltage regulator shown in FIG. 1.
Figure 3:
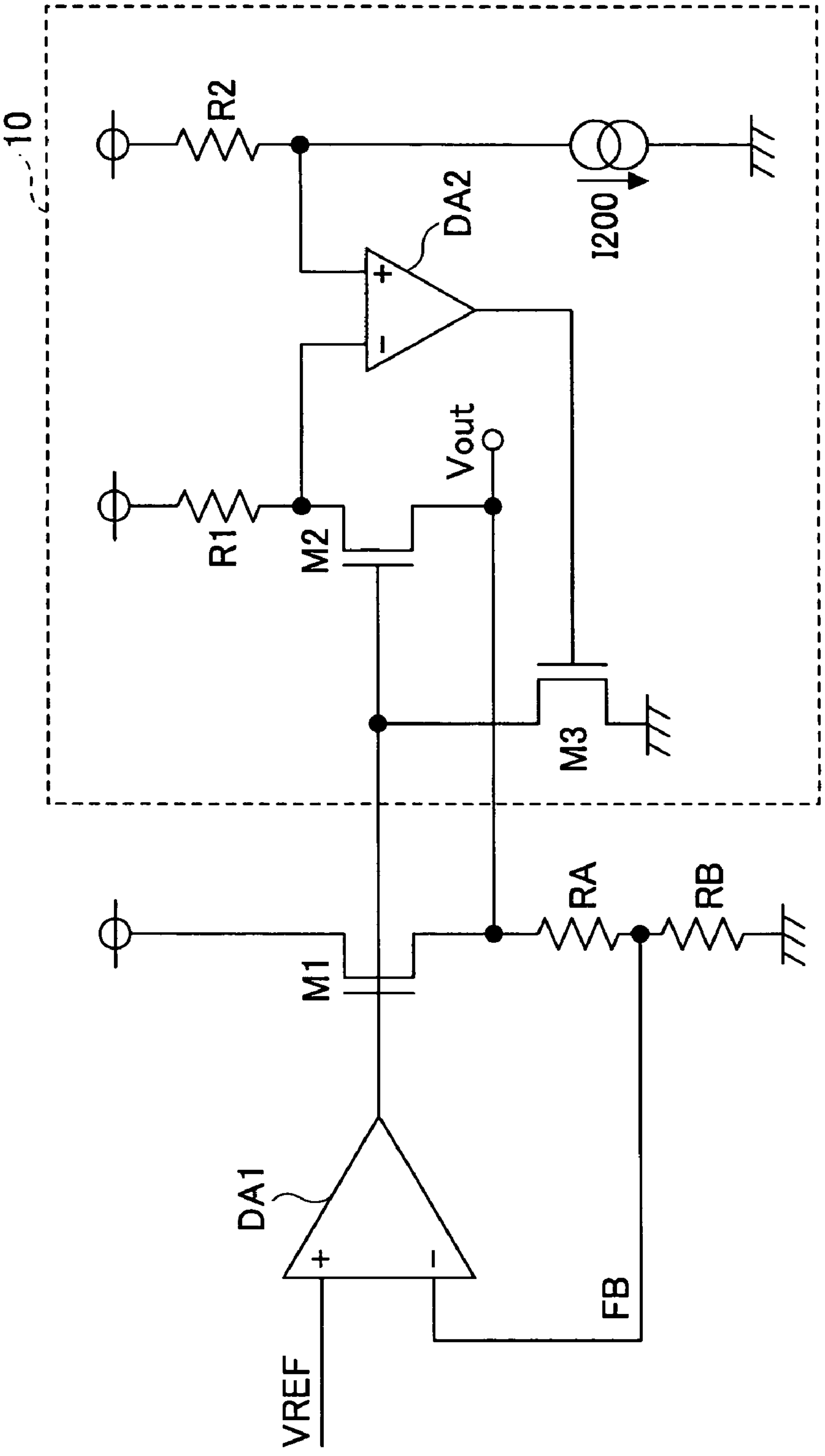
FIG. 3 is a diagram showing the embodiment of a first basic circuit of the present invention.

FIG. 3 is a diagram showing the embodiment of a first basic circuit of the present invention.

As shown in FIG. 3, the overcurrent protection (hereinafter referred also to as over current limitation) circuit of a DC stabilized power supply circuit according to this embodiment drives an output transistor M1 so as to make an output voltage constant based on the output of a differential amplifier DA1 that amplifies a difference between a reference voltage VREF and a voltage FB proportional to the output voltage.

Furthermore, the overcurrent protection circuit has a proportional output current generation unit (transistor) M2 that generates a current proportional to a current flowing to the output transistor M1 and a current voltage conversion unit (resistor) R1 that converts the output current of the proportional output current generation unit M2 into a voltage, which are connected in series between a first power supply terminal and an output terminal Vout.

Furthermore, the overcurrent protection circuit has a differential amplifier DA2 that outputs a difference between the voltage generated at the current voltage conversion unit R1 and that generated at a current voltage conversion unit (resistor) R2 provided between the first power supply terminal and a second power supply terminal, and it controls a control unit M3 with the output of the differential amplifier DA2.

The overcurrent protection circuit is designed to change a current flowing to the current voltage conversion unit (resistor) R2 in a stepwise manner using one or more switching elements (M20 and M21) based on the output voltage of the output transistor M1 when supplying the current, thereby changing the voltages generated at both ends of the current voltage conversion unit R2. A constant current I200 is obtained by applying a constant voltage to the gates of transistors (M10, M11, and M12) (see FIG. 5) provided at plural paths that branch the current flowing to the current voltage conversion unit (resistor) R2.

According to this configuration, the proportional output current generation unit M2 and the current voltage conversion unit R1 are provided between the first current supply terminal and the output terminal Vout. Therefore, the output current of the proportional output current generation unit M2 does not lead to power consumption of an IC (Integrated Circuit), thereby attaining the reduction of power consumption. Furthermore, this configuration realizes output short-circuit protection without using a fold-back characteristic. Therefore, the overcurrent protection circuit does not require a phase compensation circuit, which facilitates the design of the circuit.

Figure 4:
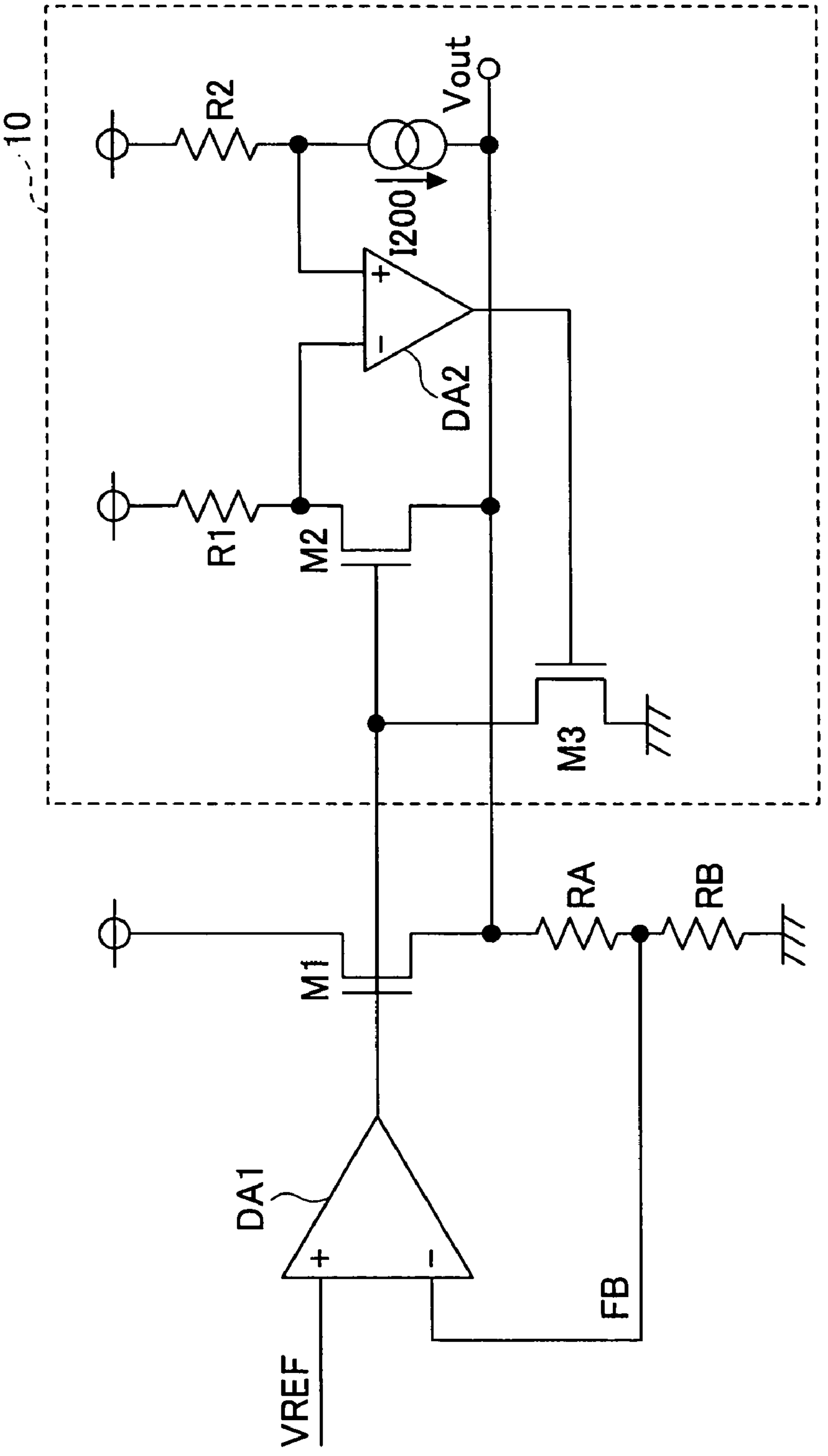
FIG. 4 is a diagram showing the embodiment of a second basic circuit of the present invention.

FIG. 4 is a diagram showing the embodiment of a second basic circuit of the present invention.

As shown in FIG. 4, the overcurrent protection circuit of a DC stabilized power supply circuit according to this embodiment drives an output transistor M1 so as to make an output voltage constant based on the output of a differential amplifier DA1 that amplifies a difference between a reference voltage VREF and a voltage FB proportional to the output voltage.

Furthermore, the overcurrent protection circuit has a proportional output current generation unit (transistor) M2 that generates a current proportional to a current flowing to the output transistor M1 and a current voltage conversion unit (resistor) R1 that converts the output current of the proportional output current generation unit M2 into a voltage, which are connected in series between a first power supply terminal and an output terminal Vout.

Furthermore, the overcurrent protection circuit has a differential amplifier DA2 that outputs a difference between the voltage generated at the current voltage conversion unit R1 and that generated at a current voltage conversion unit (resistor) R2 provided between the first power supply terminal and an output terminal Vout, and it controls a control unit M3 with the output of the differential amplifier DA2.

The overcurrent protection circuit is designed to change a current flowing to the current voltage conversion unit (resistor) R2 in a stepwise manner using one or more switching elements (M20 and M21) (see FIG. 5) based on the output voltage of the output transistor M1 when supplying the current, thereby changing the voltages generated at both ends of the current voltage conversion unit R2. A constant current I200 is a current obtained by applying a constant voltage to the gates of transistors (M10, M11, and M12) provided at plural paths that branch the current flowing to the current voltage conversion unit (resistor) R2.

The embodiment shown in FIG. 4 is different from the embodiment shown in FIG. 3 in that it has the current voltage conversion unit R2 provided between the first power supply terminal and the output terminal Vout.

According to this configuration, the proportional output current generation unit M2, the current voltage conversion unit R1, and the current voltage conversion unit R2 are provided between the first power supply terminal and the output terminal Vout. Therefore, the constant current I200 is also used as the output current of a voltage regulator, resulting in realizing low power consumption.

Figure 5:
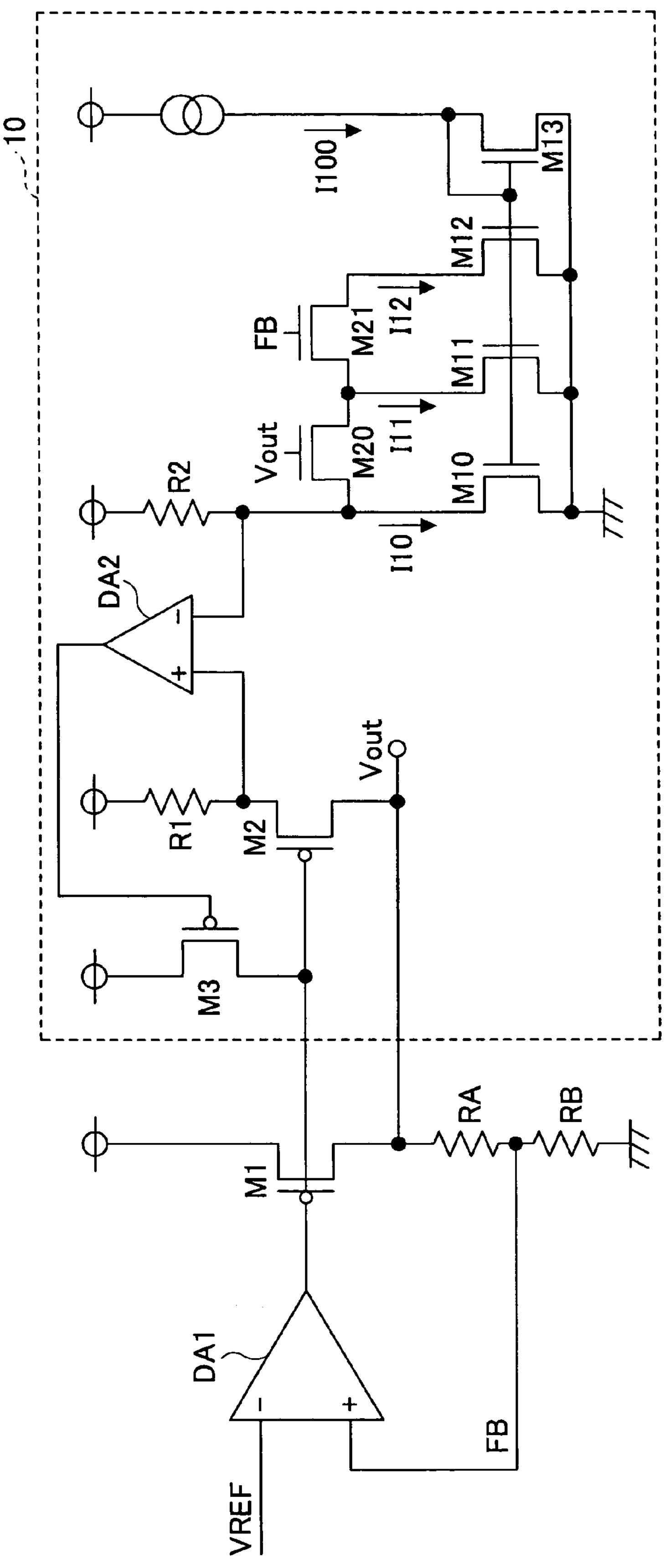
FIG. 5 is a diagram showing an embodiment of an overcurrent protection and output short-circuit protection circuit of a voltage regulator according to the present invention.

FIG. 5 is a diagram showing an embodiment of the overcurrent protection and output short-circuit protection circuit of the voltage regulator according to the present invention and refers to the embodiment in which the configurations of the one or more switching elements in the above embodiments of the basic circuits are materialized.

As shown in FIG. 5, in the overcurrent protection and output short-circuit protection circuit of the voltage regulator according to this embodiment, the output voltage of the differential amplifier DA1 is applied to the gate of the output transistor M1, and the output voltage of the output transistor M1 is divided by resistors RA and RB to generate the voltage FB proportional to the output voltage. Then, the generated voltage FB is input to the non-inverting input of the differential amplifier DA1. To the inverting input of the differential amplifier DA1 is input the reference voltage VREF.

Furthermore, the overcurrent protection and output short-circuit protection circuit has the proportional output current generation unit (transistor) M2 that generates the current proportional to the current flowing to the output transistor M1 and the current voltage conversion unit (resistor) R1 that converts the output current of the proportional output current generation unit M2 into a voltage, which are connected in series between the first power supply terminal and the output terminal Vout.

Furthermore, the overcurrent protection and output short-circuit protection circuit has the differential amplifier DA2 that takes the difference between the voltage generated at the current voltage conversion unit (resistor) R1 (the voltage at a connection point between the current voltage conversion unit R1 and the proportional output current generation unit M2) and the voltage generated at the current voltage conversion unit (resistor) R2 provided between the first power supply terminal and the second power supply terminal (ground), and it controls the control unit (transistor) M3 connected between the first power supply terminal and the output terminal of the differential amplifier DA1 with the output of the differential amplifier DA2.

The overcurrent protection and output short-circuit protection circuit is designed to change the current flowing to the current voltage conversion unit (resistor) R2 by changing current paths (the path passing through the transistor M10, the path passing through both the transistors M10 and M11, the path passing through the transistors M10, M11, and M12) in a stepwise manner using the one or more switching elements (the transistors M20 and M21 in FIG. 5) based on the output voltage of the output transistor M1 when supplying the current. Accordingly, the voltages generated at both ends of the current voltage conversion unit R2 (namely, one input of the differential amplifier DA2) is changed in a stepwise manner. As a result, the control unit (transistor) M3 is controlled in a stepwise manner.

In FIG. 5, the output voltage of the output terminal Vout and the voltage FB proportional to the output voltage of the output terminal Vout are applied to the gate voltages of the switching elements M20 and M21, respectively, and the current flowing to the current voltage conversion unit (resistor) R2 is changed by the switching elements M20 and M21 in a stepwise manner based on the output voltage of the output transistor M1 when supplying the current.

Figure 6:
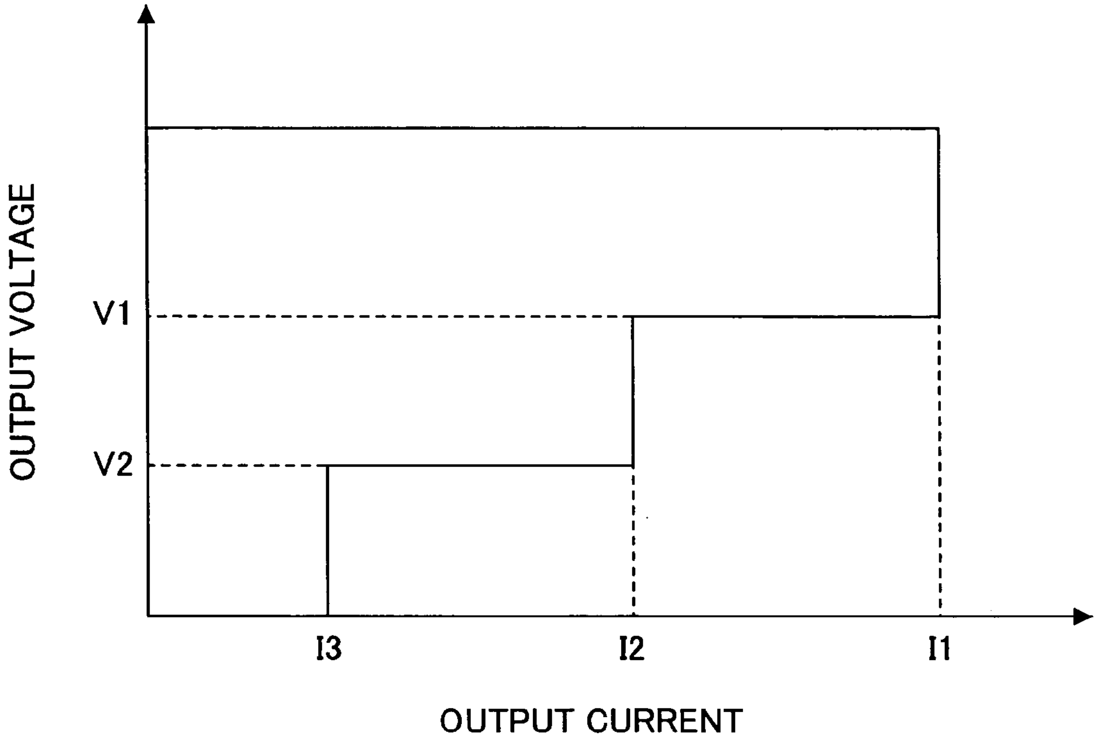
FIG. 6 is a graph showing the characteristics of an output current and an output voltage of the overcurrent protection and output short-circuit protection circuit shown in FIG. 5.

FIG. 6 is a graph showing the characteristics of the output current and the output voltage of the overcurrent protection and output short-circuit protection circuit shown in FIG. 5. Here, current limitation values I1, I2, and I3 and voltages V1 and V2 in FIG. 6 are obtained as follows.

Assume that transistor M1: W1/L1 and transistor M2: W2/L2

Where the output current is Iout, the current of the resistor R1=Iout×(W2/W1)×(L1/L2) and the voltages at both ends of the resistor R1=R1×Iout×(W2/W1)×(L1/L2)

The current limitation value I1 is obtained.

$$R1\times I1\times(W2/W1)\times(L1/L2)=R2\times(I10+I11+I12)$$

The current limitation value I1=R2×(I10+I11+I12)/(R1×(W2/W1)×(L1/L2))

The current limitation value I2 is obtained.

$$R1\times I2\times(W2/W1)\times(L1/L2)=R2\times(I10+I11)$$

The current limitation value I2=R2×(I10+I11)/(R1×(W2/W1)×(L1/L2))

The current limitation value I3 is obtained.

$$R1\times I3\times(W2/W1)\times(L1/L2)=R2\times I10$$

The current limitation value I3=R2×I10/(R1×(W2/W1)×(L1/L2))

Where the transistor M10: W10/L10, the transistor M11: W11/L11, the transistor M12: W12/L12, and the transistor M13: W13/L13, the current value I10=I0×(W10/W13)×(L13/L10), the current value I11=I0×(W11/W13)×(L13/L11), and the current value I12=I0×(W12/W13)×(L13/L12).

Where the threshold voltages of the switches (N-channel transistors M20 and M21) are Vt, the output voltage V1=Vt×(RA+RB)/RB and the output voltage V2=Vt.

As described above, according to this embodiment, the current flowing to the current voltage conversion unit (resistor) R2 is changed by the switching elements (M20 and M21) in a stepwise manner. Therefore, the overcurrent protection and output short-circuit current protection can be realized.

In addition, the output current of the proportional output current generation unit M2 is fed to the output terminal Vout, thereby contributing to save the power of the IC. That is, the output current of the proportional output current generation unit M2 is one-hundredth through one-thousandth of the output current of the output transistor M1. When the output transistor M1 outputs a current of 1 A, a current of 10 mA through 1 mA is fed to the proportional output current generation unit M2.

There is a big difference between the feeding of the current to the ground terminal, which increases the consumption current of the IC, and that of the current to the output terminal as the output current of the IC, in which the consumption current of the IC remains unchanged.

Figure 7:
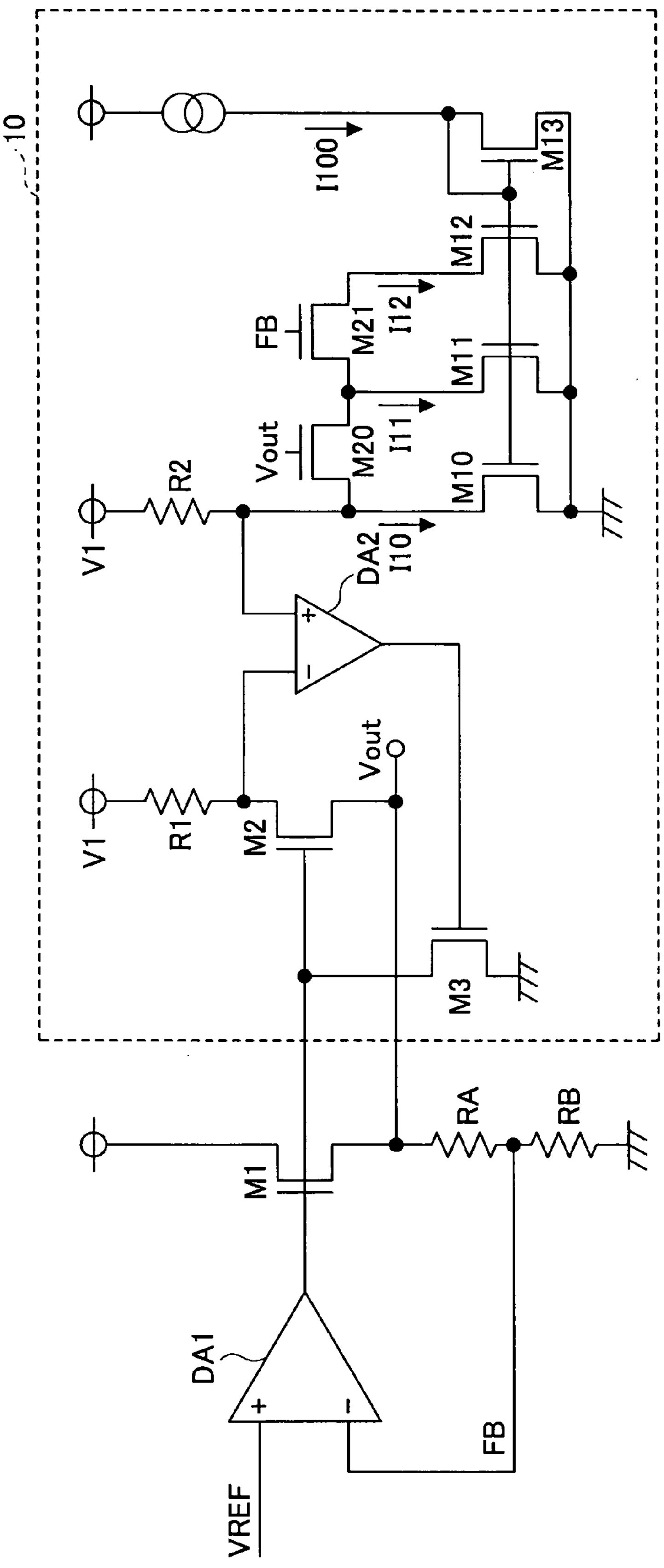
FIG. 7 is a diagram showing an embodiment when an output transistor is an N-channel transistor.

FIG. 7 is a diagram showing an embodiment when the output transistor M1 is an N-channel transistor. The embodiment of FIG. 7 is different from that of FIG. 5 in that reference voltage is applied to the non-inverting input of the differential amplifier DA1, the voltage FB proportional to the output voltage is applied to the inverting input of the differential amplifier DA1, and the control unit (transistor) M3 is connected to the second power supply terminal (ground) instead of the first power supply terminal.

Figure 8:
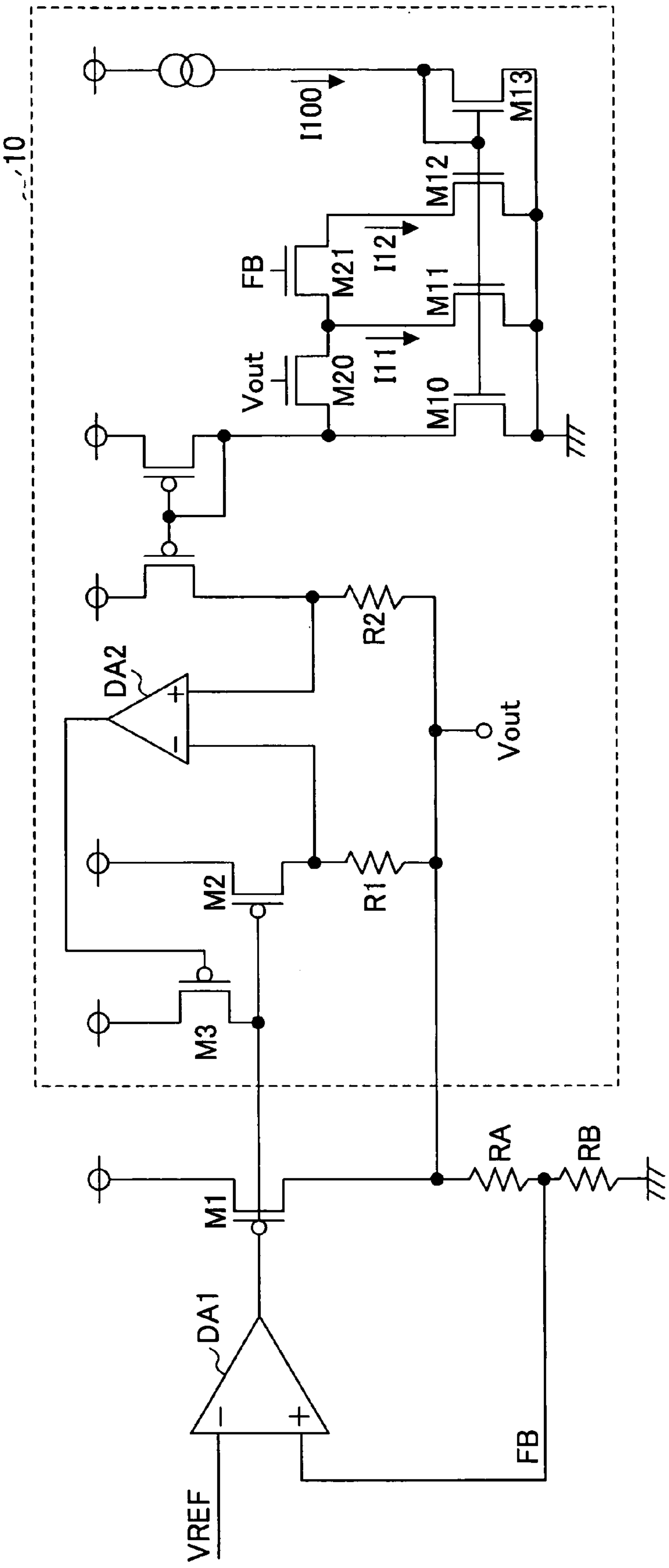
FIG. 8 is a diagram showing an embodiment when the output transistor is a P-channel transistor.

FIG. 8 is a diagram showing an embodiment when the output transistor M1 is a P-channel transistor. The connecting configuration of the current voltage conversion unit (resistor) R1 and the proportional output current generation unit M2, the current voltage conversion unit (resistor) R2, the switching elements (M20 and M21), etc., are arranged as shown in FIG. 8.

Figure 9:
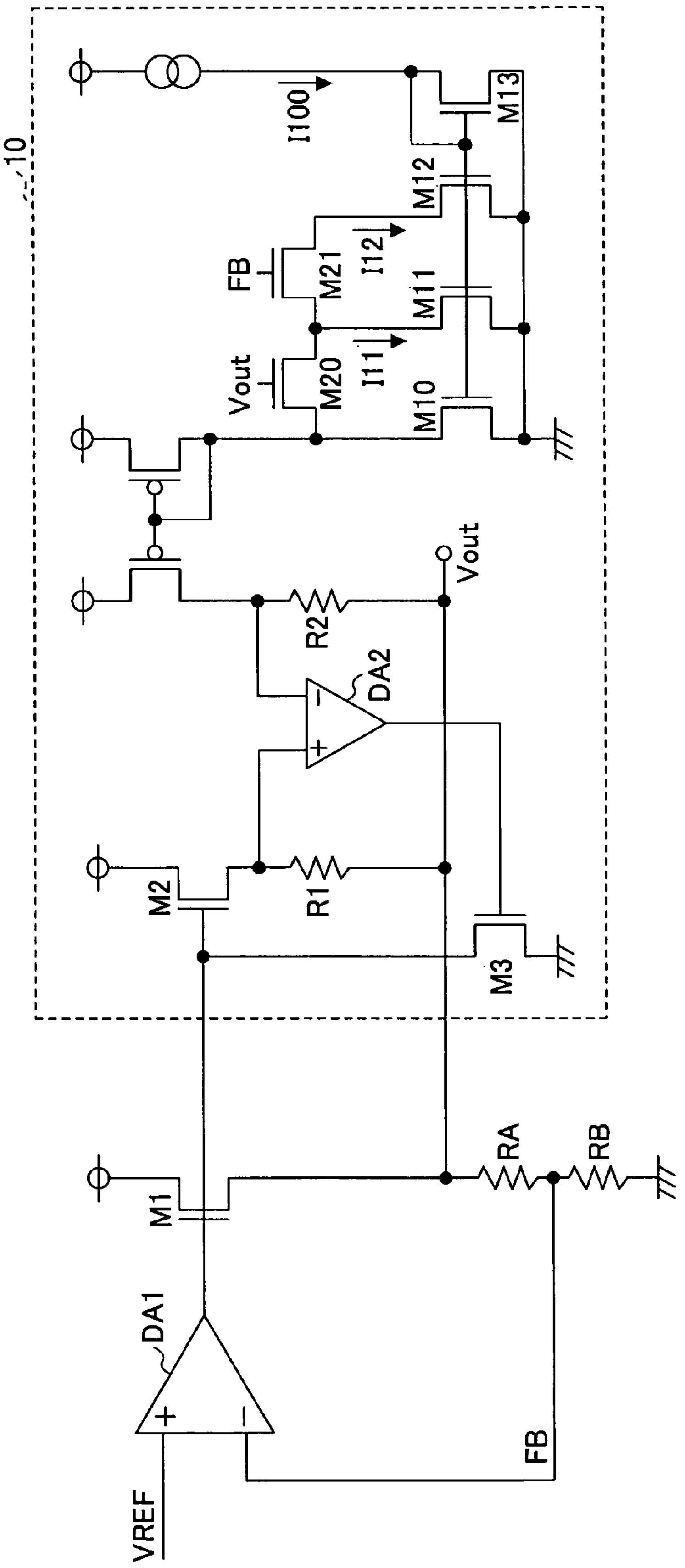
FIG. 9 is a diagram showing an embodiment when the output transistor is an N-channel transistor.

FIG. 9 is a diagram showing an embodiment when the output transistor M1 is an N-channel transistor. The connecting configuration of the current voltage conversion unit (resistor) R1 and the proportional output current generation unit M2, the current voltage conversion unit (resistor) R2, the switching elements (M20 and M21), etc., are arranged as shown in FIG. 9.

Figure 10:
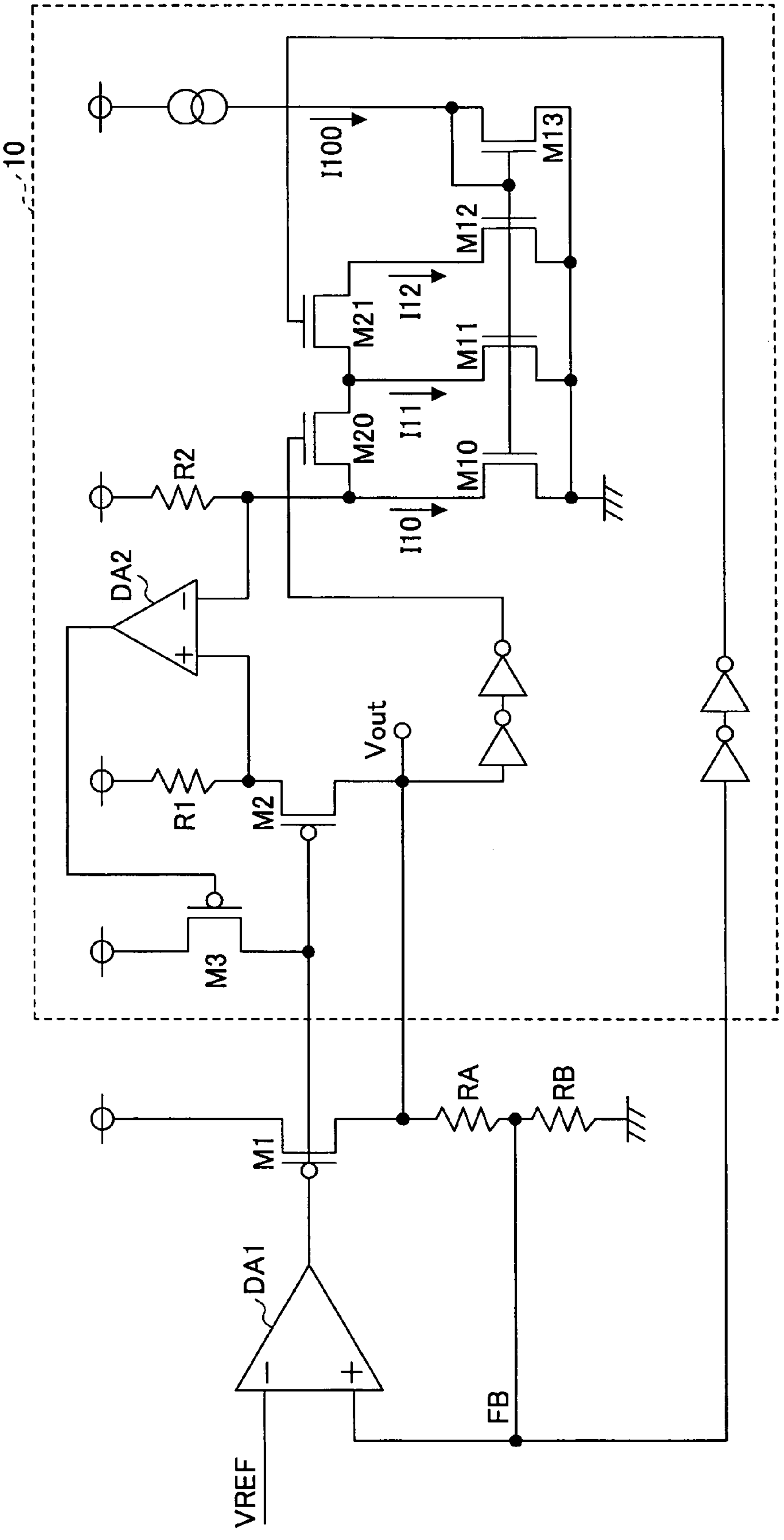
FIG. 10 is another embodiment of the overcurrent limitation and output short-circuit protection circuit according to the present invention.

FIG. 10 is another embodiment of the overcurrent limitation and output short-circuit protection circuit according to the present invention. In this embodiment, the voltage of the output terminal Vout and the voltage FB proportional to the output voltage in FIG. 5 are applied to the gates of the switching elements (M20 and M21), respectively, via two inverters.

Figure 11:
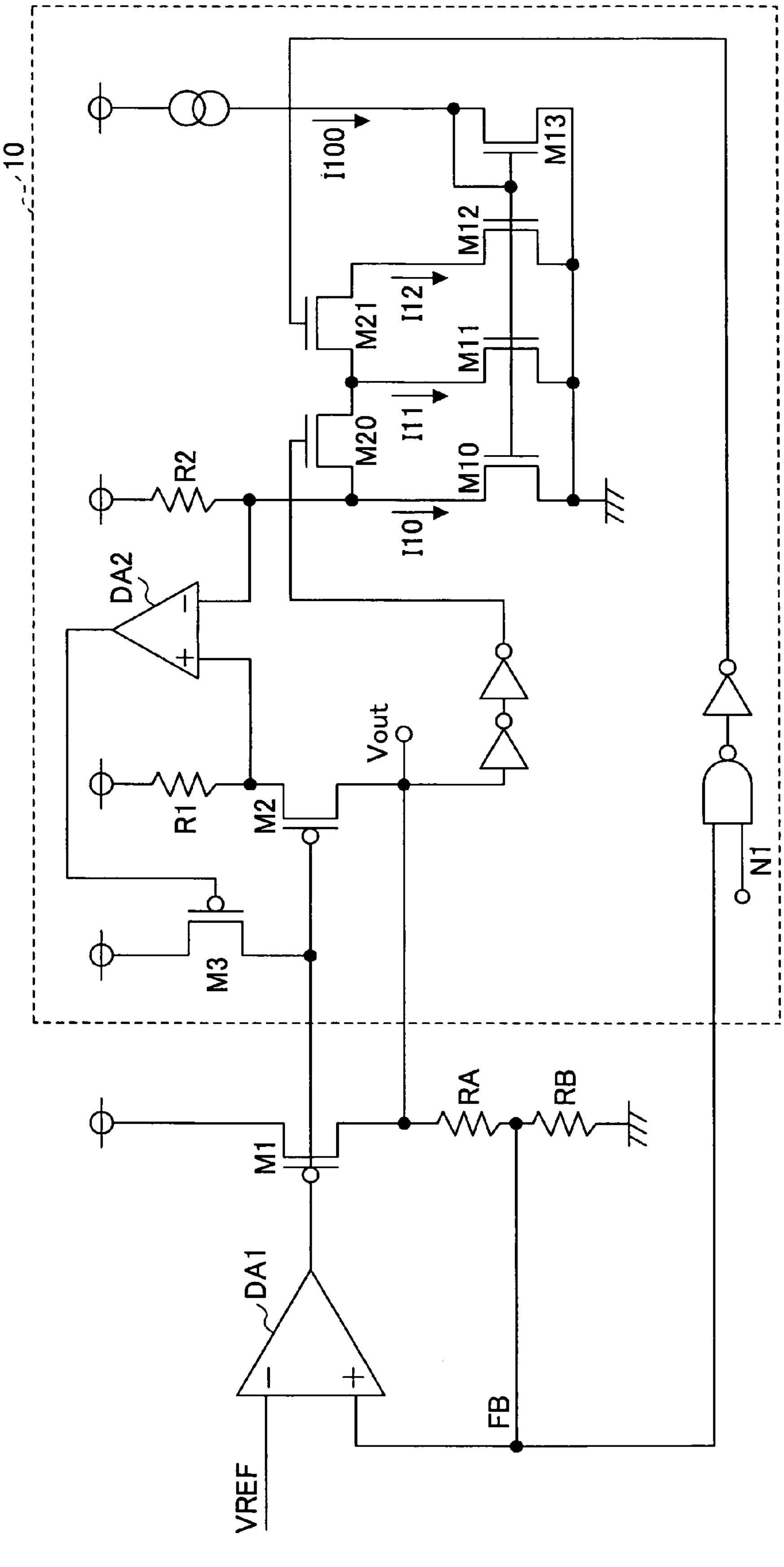
FIG. 11 is still another embodiment of the overcurrent limitation and output short-circuit protection circuit according to the present invention.
Figure 12:
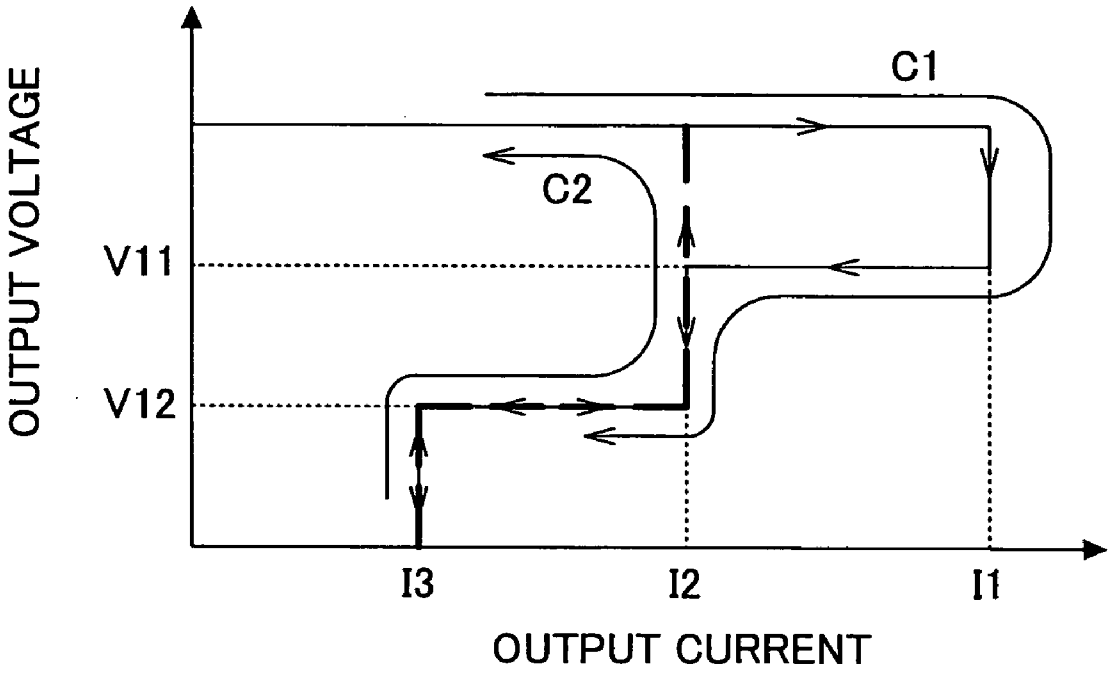
FIG. 12 is a graph showing the characteristics of the output current and the output voltage in the overcurrent limitation and output short-circuit protection circuit shown in FIG. 11.

FIG. 11 is still another embodiment of the overcurrent limitation and output short-circuit protection circuit according to the present invention, and FIG. 12 is a graph showing the characteristics of the output current and the output voltage in the overcurrent limitation and output short-circuit protection circuit.

The overcurrent limitation and output short-circuit protection circuit shown in FIG. 11 sets one of the two inverters connecting the voltage FB proportional to the output voltage in FIG. 10 to be a NAND gate and makes it possible to control the voltage of one input N1 of the NAND gate. Accordingly, in the overcurrent limitation and output short-circuit protection circuit, the IC is protected via the path C1 in the case of the overcurrent protection and the output short-circuit protection, and a power supply voltage rises due to the characteristic C2 when rising from zero (see FIG. 12).

In case the current flowing to the output transistor M1 is large when the power supply voltage rises from zero, the heating value of the IC becomes large, or the rising of the voltage regulator is interrupted by a system other than the voltage regulator. As a result, the voltage regulator may not rise.

Therefore, it is effective that the output current value be limited to I2 only when the power supply voltage rises from zero.

Furthermore, the control of the switching elements M20 and M21 when the power supply voltage rises from zero makes it possible to forcibly limit the output current value to the value I3 of FIG. 12.

By the incorporation of the above overcurrent limitation and output short-circuit protection circuit into various electronic equipment items such as voltage regulators, mobile electronic devices including mobile phones, in-vehicle electric components, and home electric appliances, various electronic equipment items capable of being realized by a small circuit with low power consumption that is easily designed can be provided.

As described above, the overcurrent limitation and output short-circuit protection circuit according to the present invention can be used for electric products in various fields. Below is an embodiment in which the overcurrent limitation and output short-circuit protection circuit according to the present invention is applied to a hybrid vehicle disclosed in JP-A-2005-175439.

Figure 13:
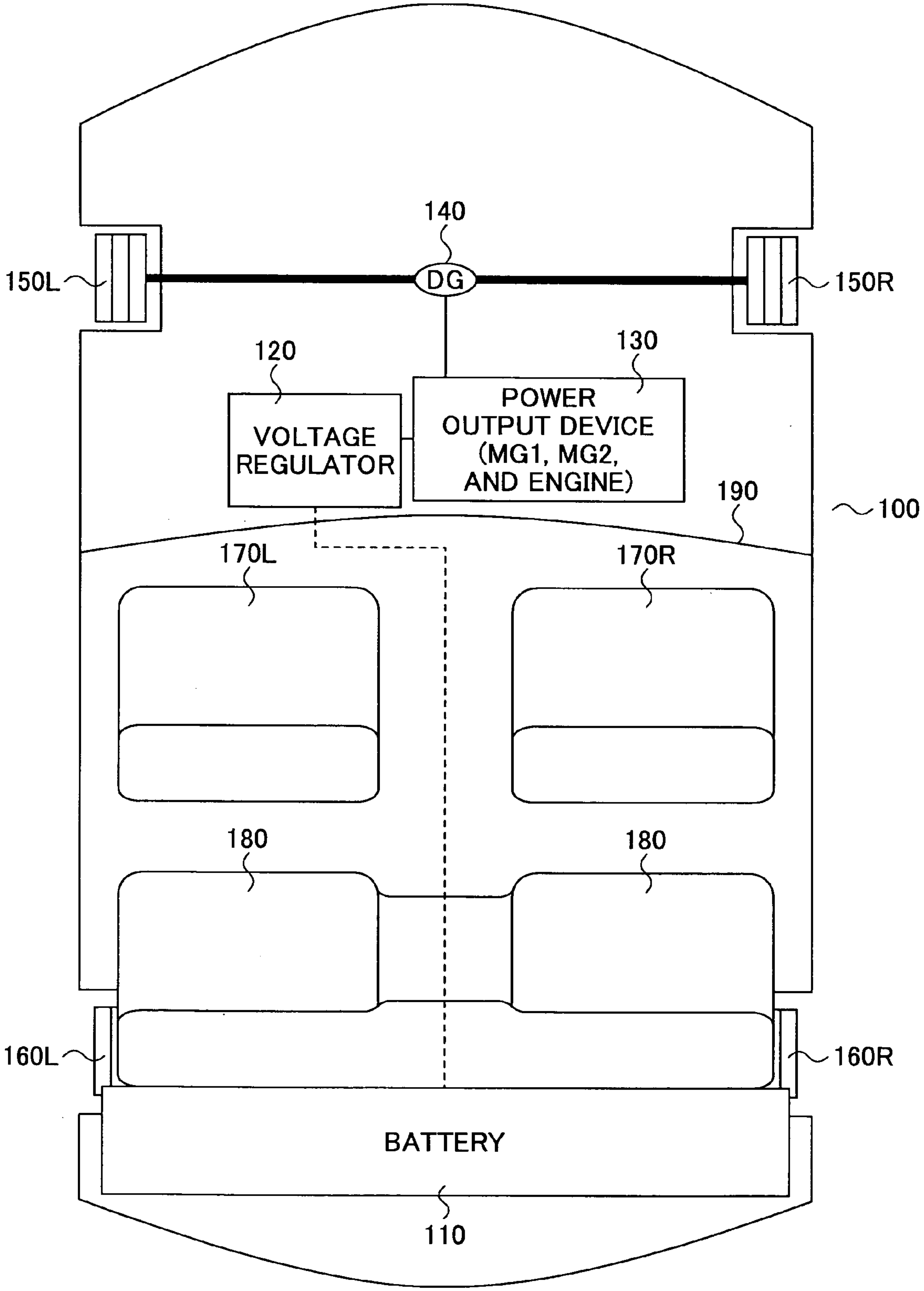
FIG. 13 is an illustration showing an embodiment in which an overcurrent limitation function according to the present invention is applied to a hybrid vehicle.

FIG. 13 is an illustration showing an embodiment of the hybrid vehicle using the voltage regulator having the overcurrent limitation and output short-circuit protection circuit according to the present invention.

As shown in FIG. 13, the hybrid vehicle 100 according to this embodiment has a battery 110, a voltage regulator 120 having an overheat protection circuit according to the present invention, a power output device 130, a differential gear 140, front wheels 150L and 150R, rear wheels 160L and 160R, front seats 170L and 170R, a rear seat 180, and a dashboard 190 (see JP-A-2005-175439 for basic operations).

The battery 110 is electrically connected to the voltage regulator 120 via a power feeding cable. The battery 110 supplies a DC voltage to the voltage regulator 120 and is charged with the DC voltage from the voltage regulator 120. The voltage regulator 120 is electrically connected to the power output device 130 via the power feeding cable, and the power output device 130 is connected to the differential gear 140.

The voltage regulator 120 raises the DC voltage from the battery 110 and converts the raised DC voltage into an AC voltage to control driving two motor generators MG1 and MG2 included in the power output device 130. Furthermore, the voltage regulator 120 converts the AC voltage generated by the motor generators included in the power output device 130 into the DC voltage to charge the battery 110.

The voltage regulator 120 has the overcurrent limitation and output short-circuit protection circuit according to the present invention and thus can be realized by a small circuit with low power consumption that is easily designed.

The present invention is not limited to the specifically disclosed embodiments, and variations and modifications may be made without departing from the scope of the present invention.

The present application is based on Japanese Priority Application No. 2007-212808 filed on Aug. 17, 2007, the entire contents of which are hereby incorporated herein by reference.

What is claimed is:

1. An overcurrent limitation and output short-circuit protection circuit of a DC stabilized power supply circuit that drives an output transistor so as to make an output voltage constant based on an output of a differential amplifier that amplifies a difference between a reference voltage and a voltage proportional to the output voltage, the overcurrent limitation and output short-circuit protection circuit comprising:

a proportional output current generation unit that generates a current proportional to a current flowing to the output transistor;

a first current voltage conversion unit that converts the output current of the proportional output current generation unit into a voltage;

a first power supply terminal;

an output terminal;

a second power supply terminal;

a second current voltage conversion unit provided between the first power supply terminal and the second power supply terminal;

a control unit that operates based on a difference between the voltage generated at the first current voltage conversion unit and a voltage generated at the second current voltage conversion unit; and one or more switching elements; wherein the proportional output current generation unit and the first current voltage conversion unit are connected in series between the first power supply terminal and the output terminal, and a current flowing to the second current voltage conversion unit is changed by the one or more switching elements in a stepwise manner based on the output voltage of the output transistor when supplying a current, thereby changing the voltages generated at both ends of the second current voltage conversion unit.

2. An overcurrent limitation and output short-circuit protection circuit of a DC stabilized power supply circuit that drives an output transistor so as to make an output voltage constant based on an output of a differential amplifier that amplifies a difference between a reference voltage and a voltage proportional to the output voltage, the overcurrent limitation and output short-circuit protection circuit comprising:

a proportional output current generation unit that generates a current proportional to a current flowing to the output transistor;

a first current voltage conversion unit that converts the output current of the proportional output current generation unit into a voltage;

a first power supply terminal;

an output terminal;

a second current voltage conversion unit provided between the first power supply terminal and the output terminal;

a control unit that operates based on a difference between the voltage generated at the first current voltage conversion unit and a voltage generated at the second current voltage conversion unit; and one or more switching elements; wherein the proportional output current generation unit and the first current voltage conversion unit are connected in series between the first power supply terminal and the output terminal, and a current flowing to the second current voltage conversion unit is changed by the one or more switching elements in a stepwise manner based on the output voltage of the output transistor when supplying a current, thereby changing the voltages generated at both ends of the second current voltage conversion unit.

3. The overcurrent limitation and output short-circuit protection circuit according to claim 1, wherein the one or more switching elements are provided in plural branched current paths passing through the second current voltage conversion unit and controlled to be turned on or turned off by the output voltage or a voltage generated based on the output voltage.

4. The overcurrent limitation and output short-circuit protection circuit according to claim 3, wherein the proportional output current generation unit has a resistor and a transistor in series connection, the first current voltage conversion unit and the second current voltage conversion unit have a resistor, and the control unit has a transistor.

5. The overcurrent limitation and output short-circuit protection circuit according to claim 1, wherein the switching elements are changed in a stepwise manner based on the output voltage when a power supply voltage rises from zero.

6. The overcurrent limitation and output short-circuit protection circuit according to claim 1, further comprising:

a unit that fixes at least one of the plural switching elements when a power supply voltage rises from zero.

7. A voltage regulator including the overcurrent limitation and output short-circuit protection circuit according to claim 1.

8. Electronic equipment including the voltage regulator according to claim 7.

9. The electronic equipment according to claim 8, wherein the electronic equipment is any one of a mobile electronic device, a DC-DC converter, an in-vehicle electric component, and a home electric appliance.

* * * * *